UNITED STATES PATENT OFFICE.

FRIEDRICH STOLZ AND FRANZ FLAECHER, OF HÖCHST-ON-THE-MAIN, GERMANY, ASSIGNORS TO FARBWERKE VORM. MEISTER, LUCIUS & BRÜNING, OF HÖCHST-ON-THE-MAIN, GERMANY, A CORPORATION OF GERMANY.

PROCESS OF MAKING ORTHO-DIOXYPHENYLETHANOLETHYLAMIN.

No. 862,674.      Specification of Letters Patent.      Patented Aug. 6, 1907.

Application filed September 13, 1906. Serial No. 334,444.

*To all whom it may concern:*

Be it known that we, FRIEDRICH STOLZ, Ph. D., and FRANZ FLAECHER, Ph. D., chemists, residing at Höchst-on-the-Main, Germany, have invented certain new and useful Improvements in Processes of Making Ortho-Dioxyphenylethanolethylamin, of which the following is a specification.

It is known that aminoacetopyrocatechols of the general formula $(HO)_2C_6H_3CO-CH_2NHX$, where X means hydrogen or alkyl, which are obtained by the action of ammonia or aliphatic amins on chlor-acetopyrocatechol, may be reduced, but the amino-alcohols thus formed have not heretofore been isolated in a pure state.

We have succeeded in obtaining the pure ortho-dioxyphenylethanolethylamin which is valuable by its physiological action, it being similar to that of the base which Takamine has isolated from the suprarenal glands.

The process consists in extracting the acid solution obtained by the reduction of ethylaminoacetopyrocatechol with a solvent, such as ether or ethyl acetate to eliminate the by-products of the reduction and in then adding to the concentrated aqueous solution an alkali, such as ammonia. The precipitated base may be transformed into its oxalate crystallized from alcohol and again regenerated from the oxalate.

The process may be carried out, for instance, as follows:—One proceeds from the solution of the reduction products, obtained for instance, by gradually adding 120 parts of sodium amalgam of 4 per centum strength to 10 parts of the hydrochlorid of ethylaminoacetopyrocatechol dissolved in 100 parts of water; the solution is kept cool and feebly acid by dropping into it dilute hydrochloric acid during the reduction. The acid solution of the reduction products is shaken out with ether, then concentrated in a vacuum, whereupon the shaking out is repeated until nothing further is absorbed by the ether. The aqueous solution to which an excess of ammonia has been added to show a distinct reaction on curcuma separates the new base when standing in the cold; it is filtered, transformed into the oxalate which crystallizes from alcohol and is isolated from the oxalate by alkalies. The compound, ortho-dioxyphenylethanolethylamin, thus obtained has the formula

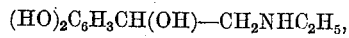

consisting of exceedingly small crystals of the melting point 183° C. It is very difficultly soluble in water, alcohol and ether. When dry, it is stable. The hydrochlorid and oxalate of the base are very easily soluble in water, but the oxalate crystallizes from alcohol. The aqueous solution of the salts becomes green on adding ferric chlorid.

Having now described our invention, what we claim is:—

1. The herein described process of making ortho-dioxyphenylethanolamins of the formula

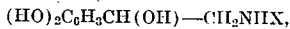

where X means alkyl or hydrogen, which consists in reducing amino-acetopyrocatechols with sodium amalgam in the cold and in the presence of acid then removing by-products from the acid solution obtained, by extraction of said solution with a solvent, then precipitating the base with an alkali and in transforming the base into its oxalate crystallizing from alcohol and in regenerating the base by addition of an alkali.

2. As product, the ortho-dioxyphenylethanolethylamin,

being a white micro-crystalline powder, very difficultly soluble in water, alcohol and ether, melting at 183°C. while decomposing; stable when dry; its hydrochlorid and oxalate being very soluble in water; the oxalate crystallizing from alcohol; the solutions of the salts becoming green on adding ferric chlorid.

In testimony, that we claim the foregoing as our invention, we have signed our names in presence of two subscribing witnesses.

FRIEDRICH STOLZ.
FRANZ FLAECHER.

Witnesses:
  JEAN GRUND,
  CARL GRUND.